UNITED STATES PATENT OFFICE.

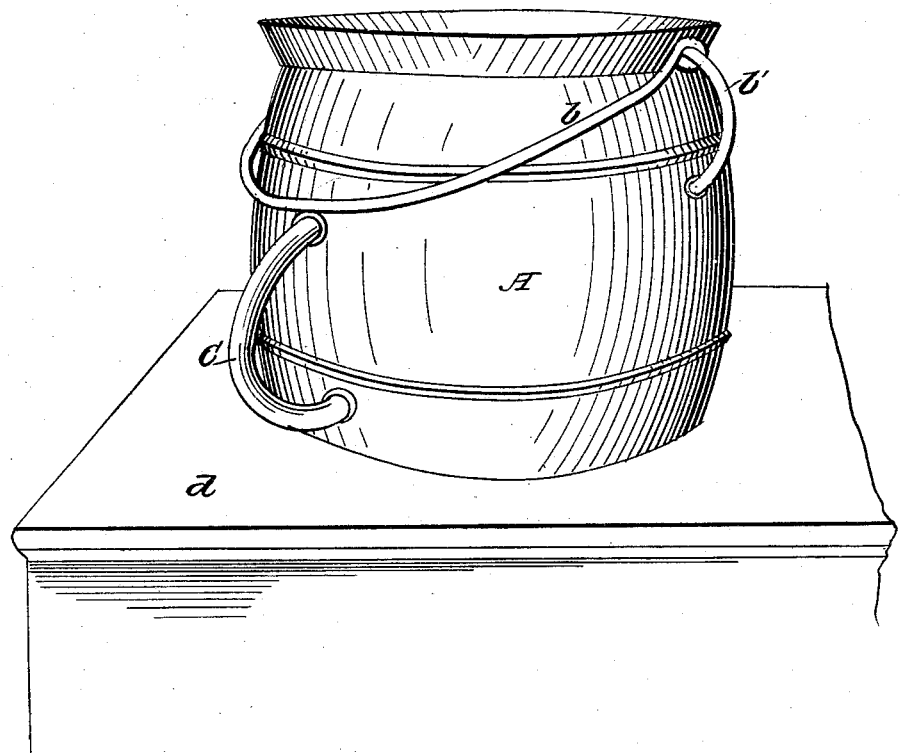

JOHN D. FLANSBURGH, OF PHILADELPHIA, PENNSYLVANIA.

IMPROVED CULINARY POT.

Specification forming part of Letters Patent No. 34,202, dated January 21, 1862.

*To all whom it may concern:*

Be it known that I, JOHN D. FLANSBURGH, of the city of Philadelphia, in the State of Pennsylvania, have invented a new and useful Improvement in Culinary Pots for Cooking-Stoves; and I do hereby declare that the following is a full, clear, and exact description of the construction and operation of the same, reference being had to the annexed drawing, making a part of this specification, and to the letters of reference marked thereon.

My invention is of an improved article of manufacture, consisting of a culinary pot for stoves, having in addition to the usual drop-bail a supplementary rigid handle simultaneously cast on one side of the same, as hereinafter described, whereby a person is enabled to obtain a more safe and commanding hold of the said pot in lifting it, filled with hot fluid, either off or on the stove, and also in pouring therefrom its scalding contents.

In the drawing, A represents the body or pot proper, $b$ its usual drop-bail, and $c$ the supplementary handle, as cast on the outer side of the same. The said vessel is in this instance represented as resting upon the top plate $d$ of a cooking-stove. The said supplementary handle $c$ is constructed, arranged, and fixed to the side of the vessel in such relation to the drop-bail $b$, as seen in the drawing, that the usual ears $b'$, to which the latter is jointed, shall serve as fulcra to support thereon the upper or mouth end of the vessel A when the same shall be tilted by means of the fixed supplementary handle $c$ in pouring therefrom.

The many scalding accidents which have arisen in lifting stove-pots filled with boiling fluid, or in pouring therefrom, when the drop-bail $b$ was the only handle available for the purposes, have been caused mainly from such defect, and it will be readily seen that such accidents can hereafter be effectually prevented by means of the supplementary handle $c$ described, because it enables a person while lifting or holding the vessel by one hand applied to the bail $b$ to steady and control the pot A with the other, and this with the greatest facility.

I wish it to be distinctly understood that I do not desire to claim, broadly, the application of a rigidly-fixed handle to the outside of a portable vessel having a drop-bail attached at its mouth or open end, as such handles have before been riveted fast to liquor-buckets, coal-scuttles, &c., for the purpose of enabling the carrier to empty the said vessels more conveniently; but

Having thus fully described my invention, and pointed out its distinctive character and utility, I claim—

As an improved article of manufacture, the culinary pot described, the same having the supplementary handle $c$ cast thereon, substantially as set forth, and for the purposes specified.

JOHN D. FLANSBURGH.

Witnesses:
BENJ. MORISON,
JAMES McCAHEN.